US009171556B2

(12) United States Patent
Sasaki et al.

(10) Patent No.: US 9,171,556 B2
(45) Date of Patent: Oct. 27, 2015

(54) MAGNETIC HEAD INCLUDING TWO CONTACT SENSORS

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Tatsuya Shimizu, Hong Kong (CN)

(73) Assignees: HEADWAY TECHNOLOGIES, INC., Milpitas, CA (US); SAE MAGNETICS (H.K.) LTD., Hong Kong (CN)

( * ) Notice: Subject to any disclaimer, the term of this patent is extended or adjusted under 35 U.S.C. 154(b) by 69 days.

(21) Appl. No.: 14/182,956

(22) Filed: Feb. 18, 2014

(65) Prior Publication Data

US 2015/0235659 A1    Aug. 20, 2015

(51) Int. Cl.
*G11B 5/127* (2006.01)
*G11B 5/31* (2006.01)
*G11B 21/12* (2006.01)
*G11B 5/00* (2006.01)

(52) U.S. Cl.
CPC ............ *G11B 5/1278* (2013.10); *G11B 5/3133* (2013.01); *G11B 5/3136* (2013.01); *G11B 5/315* (2013.01); *G11B 21/12* (2013.01); *G11B 2005/0021* (2013.01)

(58) Field of Classification Search
CPC ...... G11B 5/1278; G11B 5/607; G11B 5/315; G11B 5/3133; G11B 5/6076; G11B 5/40; G11B 5/17; G11B 5/11; G11B 5/3136; G11B 5/3909; G11B 5/6064; G11B 5/3116; G11B 5/3912; G11B 5/3967; G11B 5/314
USPC ............... 360/123.12, 317, 125.31, 125.74, 360/123.03
See application file for complete search history.

(56) References Cited

U.S. PATENT DOCUMENTS

| | | | |
|---|---|---|---|
| 8,094,418 B2 * | 1/2012 | Schreck et al. | 360/317 |
| 8,345,382 B1 * | 1/2013 | Sasaki et al. | 360/123.06 |
| 8,837,083 B1 * | 9/2014 | Sasaki et al. | 360/125.03 |
| 8,837,089 B1 * | 9/2014 | Sasaki et al. | 360/125.31 |
| 2009/0251828 A1 | 10/2009 | Schreck et al. | |
| 2012/0218662 A1 | 8/2012 | Sasaki et al. | |
| 2012/0257304 A1 * | 10/2012 | Sasaki et al. | 360/123.12 |

* cited by examiner

*Primary Examiner* — Ali Neyzari
(74) *Attorney, Agent, or Firm* — Oliff PLC

(57) ABSTRACT

A magnetic head includes a medium facing surface, a read head unit, a write head unit, and a protrusion device. The protrusion device causes part of the medium facing surface to protrude toward a recording medium. The read head unit has a first end face located in the medium facing surface and includes a first contact sensor for detecting contact of the first end face with the recording medium. The write head unit has a second end face located in the medium facing surface and includes a second contact sensor for detecting contact of the second end face with the recording medium. The first end face and the second end face are located at positions different from each other in a direction of travel of the recording medium.

4 Claims, 14 Drawing Sheets

MAGNETIC HEAD INCLUDING TWO CONTACT SENSORS

BACKGROUND OF THE INVENTION

1. Field of the Invention

The present invention relates to a magnetic head including a read head unit, a write head unit and two contact sensors.

2. Description of the Related Art

The recording systems of magnetic read/write apparatuses include a longitudinal magnetic recording system in which signals are magnetized in a direction along the plane of a recording medium (the longitudinal direction) and a perpendicular magnetic recording system in which signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole passes therethrough a magnetic flux corresponding to the magnetic field produced by the coil, and produces a write magnetic field from its end face.

A magnetic head for use in a magnetic disk drive such as a hard disk drive is typically in the form of a slider. The slider has the medium facing surface. The medium facing surface has an air inflow end (a leading end) and an air outflow end (a trailing end). The slider is designed to slightly fly over the surface of a recording medium by means of an airflow that comes from the leading end into the space between the medium facing surface and the recording medium.

It is demanded of magnetic disk drives that the distance between the medium facing surface and the recording medium be reduced for higher recording densities. To meet the demand, a magnetic head including a heater has been proposed, as disclosed in U.S. Patent Application Publication Nos. 2009/0251828 A1 and 2012/0218662 A1, for example. The magnetic head including the heater is configured so that part of the magnetic head expands with heat generated by the heater, and part of the medium facing surface thereby protrudes. This allows for a reduction in the distance between the medium facing surface and the recording medium.

For the magnetic head described above, the distance between the medium facing surface and the recording medium is controlled in the following manner, for example. First, before shipment of a magnetic disk drive as a final product, the following test is performed. In the test, with the slider floated above the surface of a rotating recording medium, the magnitude of the power being supplied to the heater is gradually increased to gradually increase the amount of protrusion of part of the medium facing surface. Then, the magnitude of the supply power to the heater at which the part of the medium facing surface comes into contact with the recording medium is determined. Such magnitude of the supply power will be referred to as "power at contact". At the time of shipment of the magnetic disk drive as a final product, the magnitude of the supply power to the heater is set to a predetermined value smaller than the power at contact. The distance between the medium facing surface and the recording medium is recognized and controlled by the magnitude of the supply power to the heater.

To control the distance between the medium facing surface and the recording medium in the above-described manner, it is necessary to detect contact of part of the medium facing surface with the recording medium in the foregoing test. The magnetic head disclosed in U.S. Patent Application Publication No. 2012/0218662 A1 includes a contact sensor for detecting contact of part of the medium facing surface with the recording medium. For this magnetic head, it is thus possible to detect contact of part of the medium facing surface with the recording medium through the use of the contact sensor.

For magnetic heads to achieve desired read and write characteristics suitable for high recording densities, it is desirable that the distance between the read head unit and the recording medium and the distance between the write head unit and the recording medium be adjusted to respective desired small values.

The magnetic head disclosed in U.S. Patent Application Publication No. 2009/0251828 A1 includes two heaters: one for causing a read sensor to protrude; and the other for causing a main pole layer to protrude. In this magnetic head, the amount of protrusion of the read sensor and the amount of protrusion of the main pole layer can be controlled independently of each other. However, it is impossible with this magnetic head to know how much amount of protrusion of the read sensor will bring the read sensor into contact with the recording medium and how much amount of protrusion of the main pole layer will bring the main pole layer into contact with the recording medium. It is thus difficult with this magnetic head to recognize and control the distance between the read sensor and the recording medium and the distance between the main pole layer and the recording medium during actual use.

For the magnetic head disclosed in U.S. Patent Application Publication No. 2012/0218662 A1, it is possible to detect contact of part of the medium facing surface with the recording medium through the use of the contact sensor, as mentioned above. In this magnetic head, however, a contact of part of the medium facing surface with the recording medium will not always bring both of the read head unit and the write head unit into contact with the recording medium, and it is thus impossible to know the relative positions of the read head unit and the write head unit with respect to the recording medium when part of the medium facing surface is in contact with the recording medium. Consequently, even if the foregoing test is performed before shipment of the magnetic disk drive as a final product, it is difficult with this magnetic head to recognize and control the distance between the read head unit and the recording medium and the distance between the write head unit and the recording medium during actual use.

OBJECT AND SUMMARY OF THE INVENTION

It is an object of the present invention to provide a magnetic head that makes it possible to recognize and control both of the distance between the read head unit and the recording medium and the distance between the write head unit and the recording medium during actual use.

A magnetic head of the present invention includes a medium facing surface facing a recording medium, a read head unit for reading data stored on the recording medium, a write head unit for writing data on the recording medium, and a protrusion device for causing part of the medium facing surface to protrude toward the recording medium. The read head unit has a first end face located in the medium facing surface, and includes a first contact sensor for detecting contact of the first end face with the recording medium. The write head unit has a second end face located in the medium facing surface, and includes a second contact sensor for detecting contact of the second end face with the recording medium. The first end face and the second end face are located at positions different from each other in a direction of travel of the recording medium.

In the magnetic head of the present invention, the protrusion device may include a first heater for generating heat to cause the first end face to protrude and a second heater for generating heat to cause the second end face to protrude. In this case, the first contact sensor may be located closer to the first heater than to the second heater, and the second contact sensor may be located closer to the second heater than to the first heater.

In the magnetic head of the present invention, the read head unit may include a magnetoresistive element. The write head unit may include a coil for producing a magnetic field corresponding to the data to be written by the write head unit, and a main pole configured to pass therethrough a magnetic flux corresponding to the magnetic field produced by the coil, and to produce a write magnetic field for writing the data on the recording medium by means of a perpendicular magnetic recording system. In this case, the protrusion device may include a first heater for generating heat to cause the first end face to protrude and a second heater for generating heat to cause the second end face to protrude. The first heater may be located closer to the magnetoresistive element than to the main pole, and the second heater may be located closer to the main pole than to the magnetoresistive element. The first contact sensor may be located closer to the first heater than to the second heater, and the second contact sensor may be located closer to the second heater than to the first heater.

In the magnetic head of the present invention, the first and second contact sensors make it possible to recognize the state of the magnetic head where both of the first and second end faces are in contact with the recording medium. The magnetic head of the present invention thus allows both of the distance between the read head unit and the recording medium and the distance between the write head unit and the recording medium to be recognized and controlled during actual use.

Other and further objects, features and advantages of the present invention will appear more fully from the following description.

DETAILED DESCRIPTION OF THE PREFERRED EMBODIMENTS

First Embodiment

Figure 1:
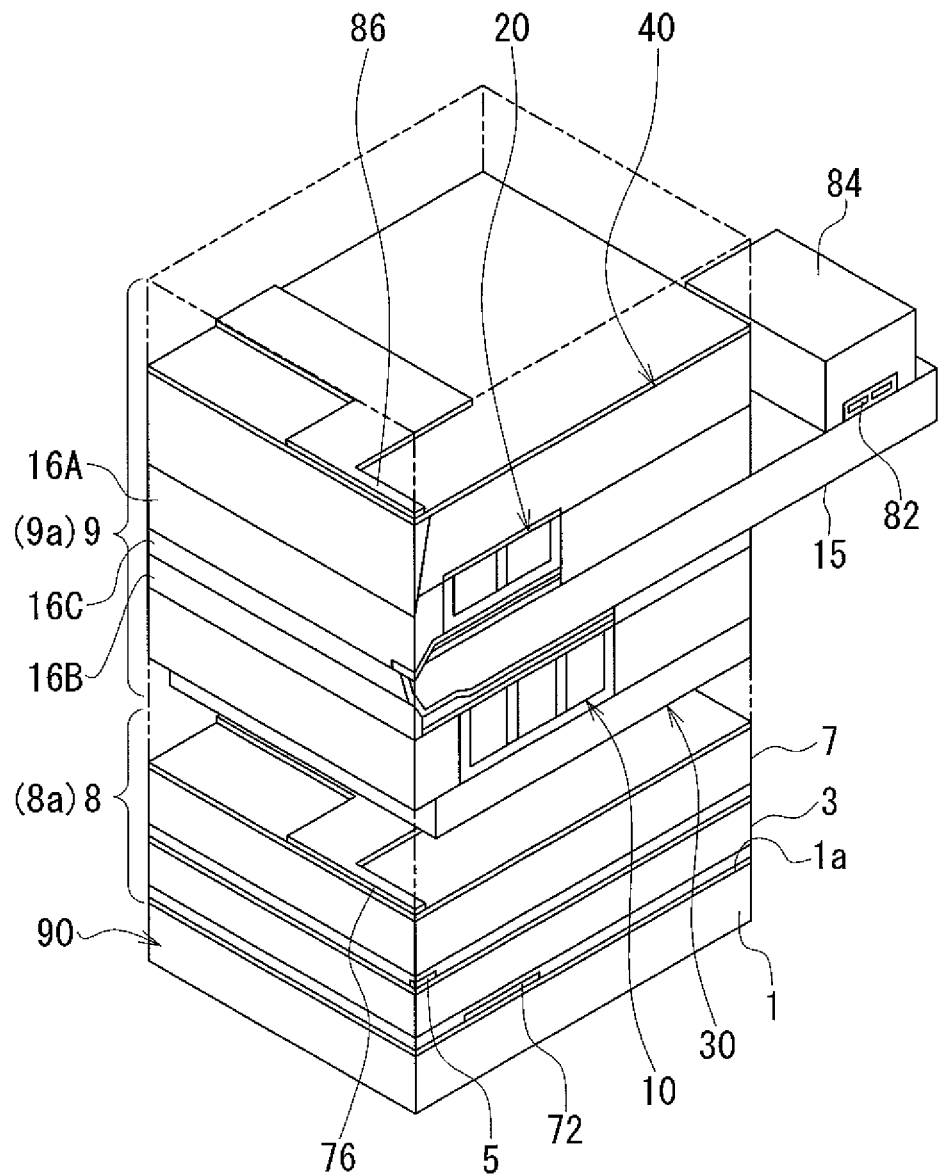
FIG. 1 is a perspective view of part of a magnetic head according to a first embodiment of the invention.
Figure 2:
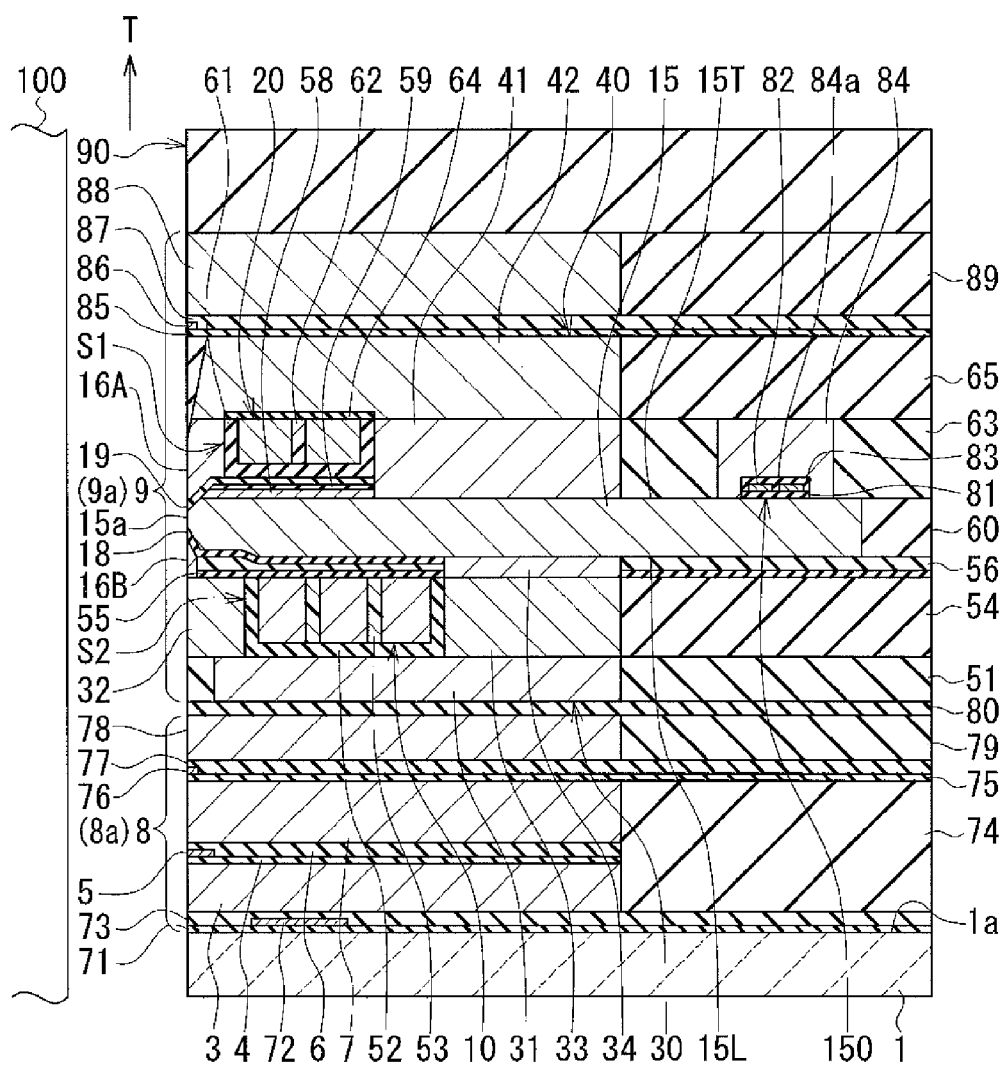
FIG. 2 is a cross-sectional view of the magnetic head according to the first embodiment of the invention.
Figure 3:
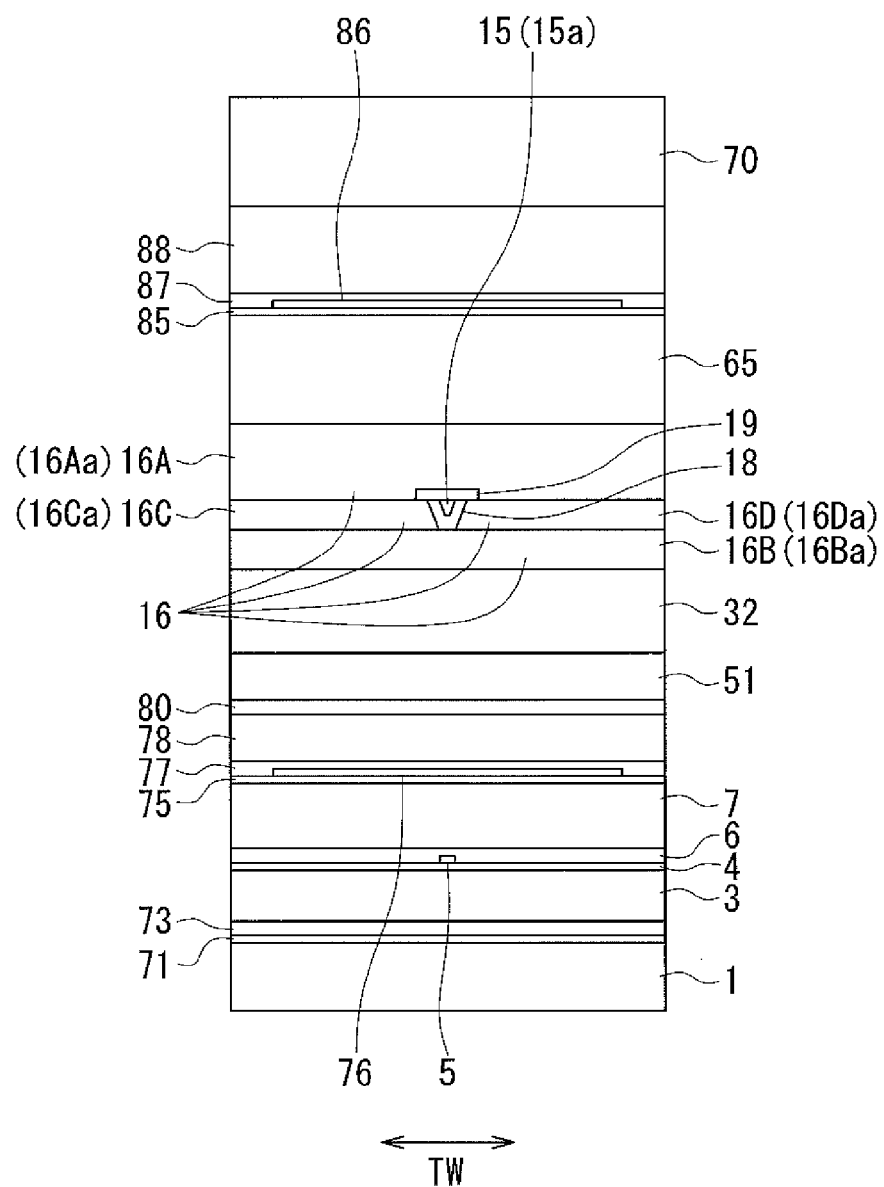
FIG. 3 is a front view showing the medium facing surface of the magnetic head according to the first embodiment of the invention.
Figure 4:
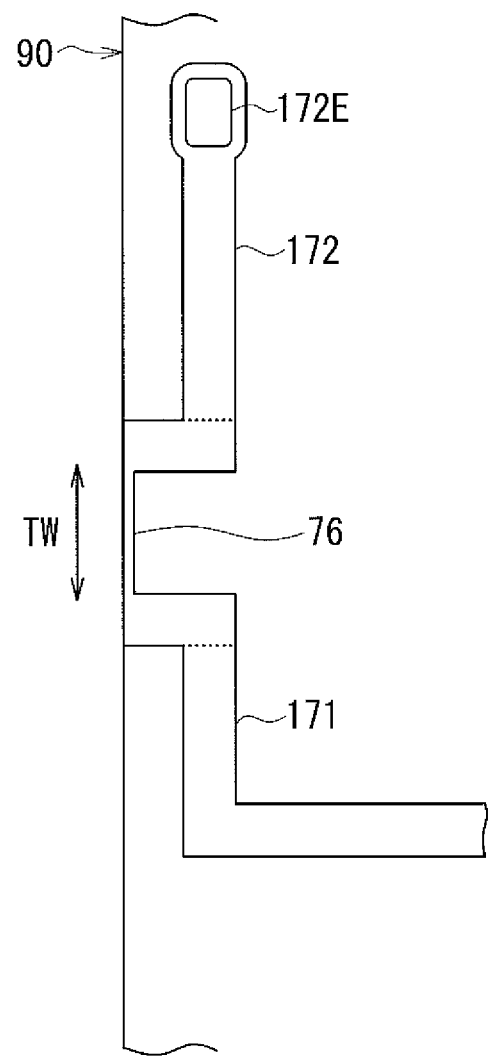
FIG. 4 is a plan view showing a first contact sensor of the magnetic head according to the first embodiment of the invention.
Figure 5:
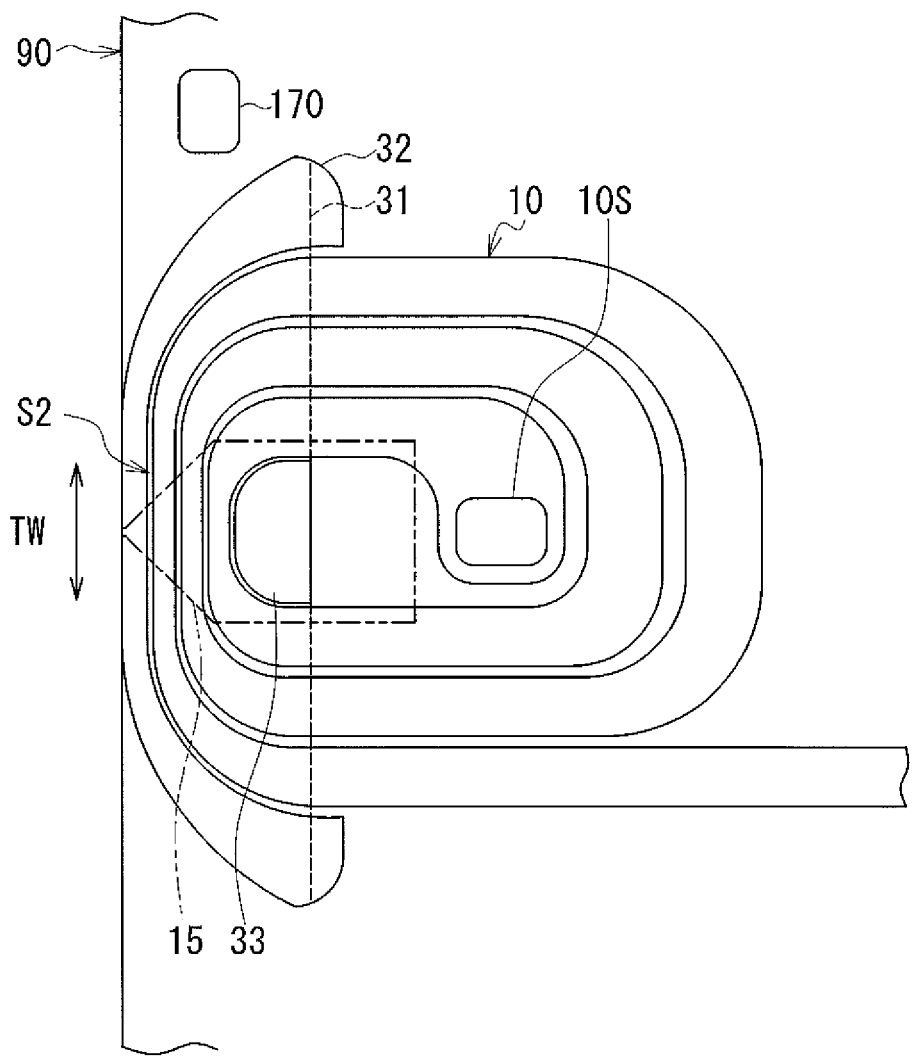
FIG. 5 is a plan view showing a second portion of a coil of the magnetic head according to the first embodiment of the invention.
Figure 6:
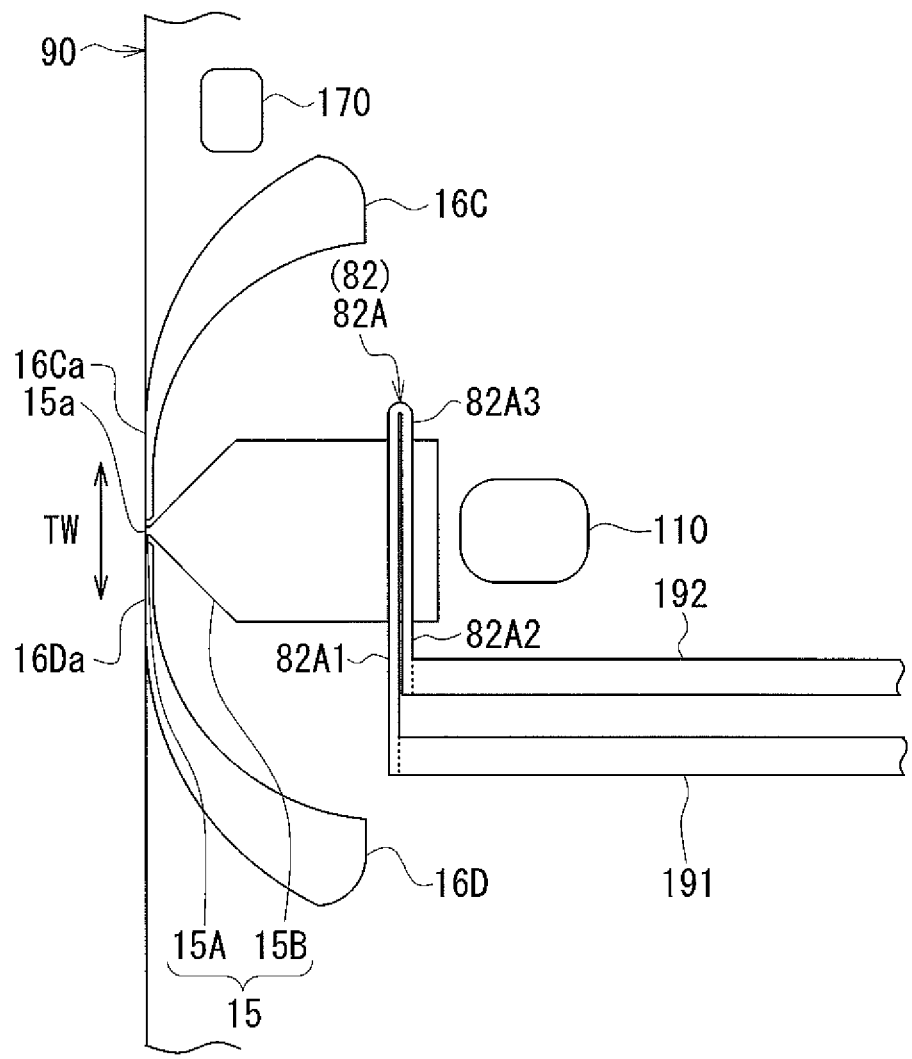
FIG. 6 is a plan view showing a main pole and a second heater of the magnetic head according to the first embodiment of the invention.
Figure 7:
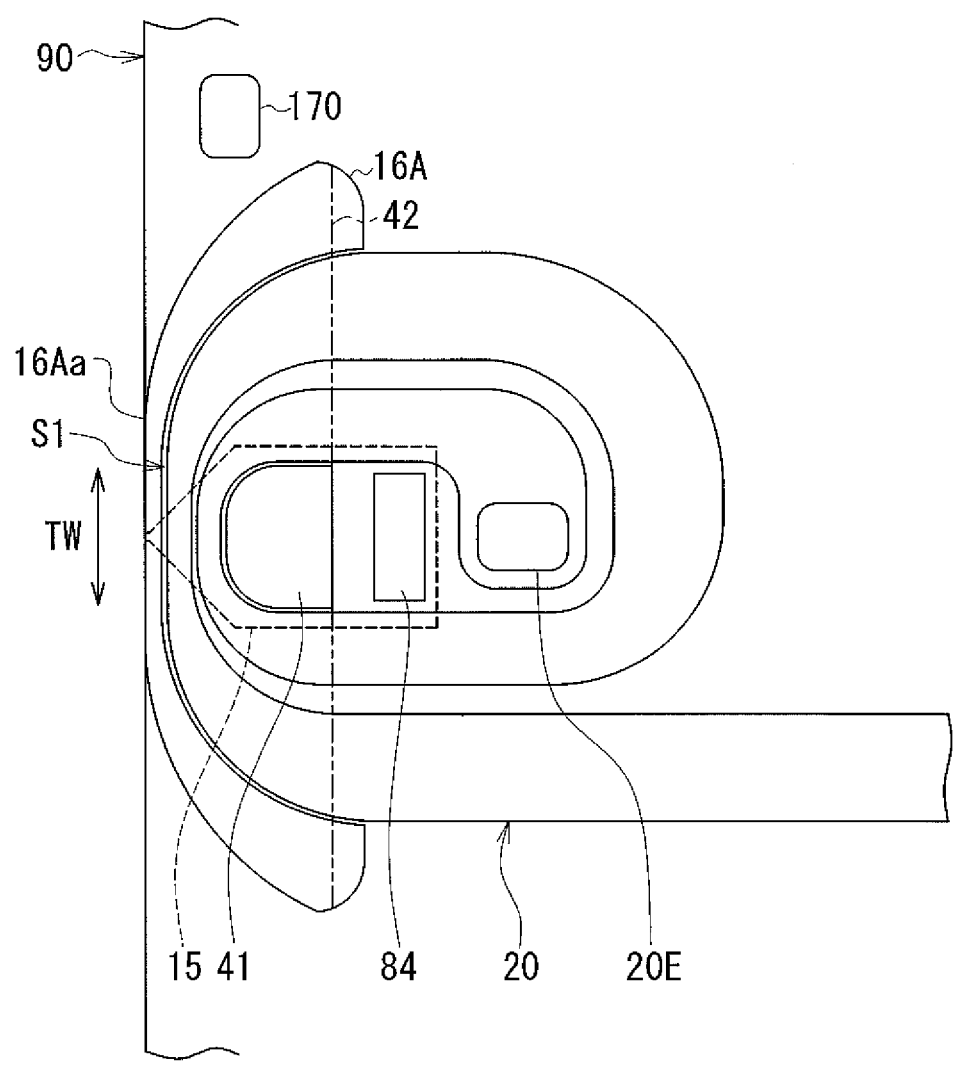
FIG. 7 is a plan view showing a first portion of the coil of the magnetic head according to the first embodiment of the invention.
Figure 8:
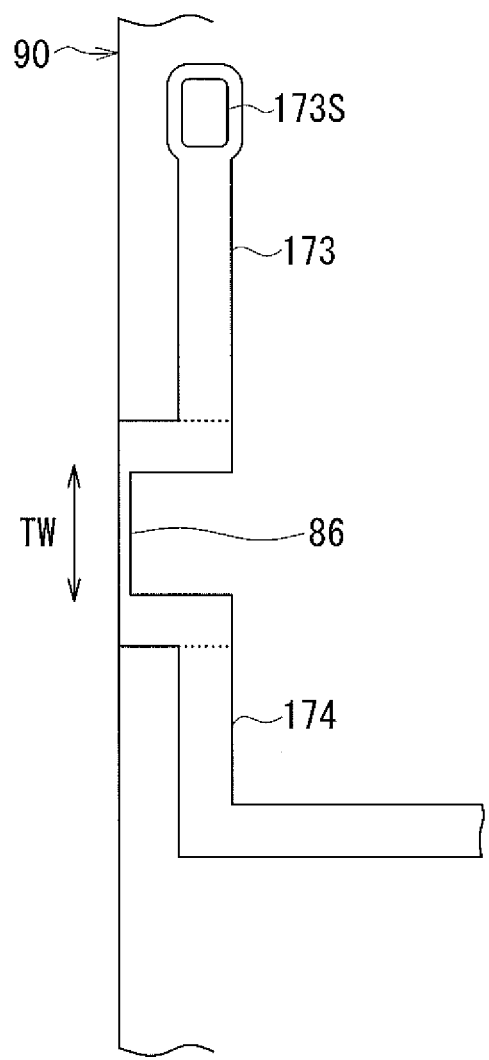
FIG. 8 is a plan view showing a second contact sensor of the magnetic head according to the first embodiment of the invention.

Preferred embodiments of the present invention will now be described in detail with reference to the drawings. First, reference is made to FIG. 1 to FIG. 8 to describe the configuration of a magnetic head according to a first embodiment of the invention. FIG. 1 is a perspective view of part of the magnetic head according to the present embodiment. FIG. 2 is a cross-sectional view of the magnetic head according to the present embodiment. The arrow with the symbol T in FIG. 2 indicates the direction of travel of a recording medium. FIG. 3 is a front view showing the medium facing surface of the magnetic head according to the present embodiment. FIG. 4 is a plan view showing a first contact sensor of the magnetic head according to the present embodiment. FIG. 5 is a plan view showing a second portion of a coil of the magnetic head according to the present embodiment. FIG. 6 is a plan view showing a main pole and a second heater of the magnetic head according to the present embodiment. FIG. 7 is a plan view showing a first portion of the coil of the magnetic head according to the present embodiment. FIG. 8 is a plan view showing a second contact sensor of the magnetic head according to the present embodiment. The arrow with the symbol TW in each of FIG. 3 to FIG. 8 indicates the track width direction.

The magnetic head according to the present embodiment is for use in, for example, a magnetic disk drive and is in the form of a slider to fly over the surface of a rotating recording medium 100. The magnetic head according to the present embodiment is intended for perpendicular magnetic recording, in particular. As shown in FIG. 1 and FIG. 2, the magnetic head (the slider) has a medium facing surface 90 facing the recording medium 100. The medium facing surface 90 has an air inflow end (a leading end) and an air outflow end (a trailing end). The slider is designed to slightly fly over the surface of the recording medium 100 by means of an airflow that comes from the leading end into the space between the medium facing surface 90 and the recording medium 100.

As shown in FIG. 2 and FIG. 3, the magnetic head includes a substrate 1 formed of a ceramic material such as aluminum oxide-titanium carbide ($Al_2O_3$—TiC) and having a top surface 1a, an insulating layer 71 formed of an insulating material and disposed on the top surface 1a of the substrate 1, a first heater 72 disposed on the insulating layer 71, and an insulating layer 73 formed of an insulating material and disposed to cover the insulating layer 71 and the first heater 72. The insulating layers 71 and 73 are formed of alumina ($Al_2O_3$), for example. The first heater 72 will be described in detail later.

The magnetic head further includes a first read shield layer 3 formed of a magnetic material and disposed on the insulating layer 73, a first read shield gap film 4 which is an insulating film disposed to cover the first read shield layer 3, a magnetoresistive (MR) element 5 serving as a read element disposed on the first read shield gap film 4, a second read shield gap film 6 which is an insulating film disposed on the MR element 5, and a second read shield layer 7 formed of a magnetic material and disposed on the second read shield gap film 6.

An end of the MR element 5 is located in the medium facing surface 90. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The magnetic head further includes a nonmagnetic layer 74 formed of a nonmagnetic material. The nonmagnetic layer 74 is disposed around the first read shield layer 3, the first read shield gap film 4, the second read shield gap film 6 and the second read shield layer 7. The nonmagnetic layer 74 is formed of alumina, for example.

The magnetic head further includes a nonmagnetic layer 75 formed of a nonmagnetic material and disposed on the second read shield layer 7 and the nonmagnetic layer 74, a first contact sensor 76 disposed on the nonmagnetic layer 75, a pair of leads 171 and 172 (see FIG. 4) connected to opposite ends of the first contact sensor 76, and a nonmagnetic layer 77 formed of a nonmagnetic material and disposed to cover the nonmagnetic layer 75, the first contact sensor 76 and the leads 171 and 172. In FIG. 4, the boundaries between the first contact sensor 76 and the leads 171 and 172 are indicated in dotted lines. The nonmagnetic layers 75 and 77 are formed of alumina, for example. The first contact sensor 76 will be described in detail later.

The magnetic head further includes a middle shield layer 78 formed of a magnetic material and disposed on the nonmagnetic layer 77, and a nonmagnetic layer 79 formed of a nonmagnetic material and disposed around the middle shield layer 78. The nonmagnetic layer 79 is formed of alumina, for example.

The parts from the insulating layer 71 to the middle shield layer 78 and the nonmagnetic layer 79 constitute a read head unit 8. The magnetic head further includes a nonmagnetic layer 80 disposed on the middle shield layer 78 and the nonmagnetic layer 79, and a write head unit 9 disposed on the nonmagnetic layer 80. The middle shield layer 78 has the function of shielding the MR element 5 from magnetic fields generated at the write head unit 9. The nonmagnetic layer 80 is formed of alumina, for example.

The write head unit 9 includes a coil, a main pole 15, and a write shield 16. The coil produces a magnetic field corresponding to data to be written on the recording medium 100. The coil includes a first portion 20 and a second portion 10. The first portion 20 and the second portion 10 are both formed of a conductive material such as copper. The first portion 20 and the second portion 10 are connected in series or in parallel. The main pole 15 has an end face 15a located in the medium facing surface 90. The main pole 15 passes therethrough a magnetic flux corresponding to the magnetic field produced by the coil, and produces a write magnetic field for writing data on the recording medium 100 by means of a perpendicular magnetic recording system. Consequently, a magnetic flux is produced from the end face 15a of the main pole 15 and magnetizes a portion of the recording medium 100. Now, a cross section that intersects the end face 15a of the main pole 15 located in the medium facing surface 90 and that is perpendicular to the medium facing surface 90 and to the top surface 1a of the substrate 1 will be referred to as the main cross section. FIG. 1 shows the magnetic head cut at the main cross section. FIG. 2 shows the main cross section.

The write shield 16 has an end face located in the medium facing surface 90. The end face of the write shield 16 includes first to fourth end face portions 16Aa, 16Ba, 16Ca, and 16Da. The first end face portion 16Aa is located on the front side in the direction T of travel of the recording medium 100 relative to the end face 15a of the main pole 15. The front side in the direction T of travel of the recording medium 100 refers to the side of the positions closer to the trailing end relative to a reference position. The second end face portion 16Ba is located on the rear side in the direction T of travel of the recording medium 100 relative to the end face 15a of the main pole 15. The rear side in the direction T of travel of the recording medium 100 refers to the side of the positions closer to the leading end relative to the reference position. The third and fourth end face portions 16Ca and 16Da are located on opposite sides of the end face 15a of the main pole 15 in the track width direction TW. In the medium facing surface 90, the first to fourth end face portions 16Aa, 16Ba, 16Ca, and 16Da are arranged to wrap around the end face 15a of the main pole 15.

The write shield 16 is formed of a magnetic material. For example, CoFeN, CoNiFe, NiFe, or CoFe can be used to form the write shield 16.

The write head unit 9 further includes a first return path section 40 and a second return path section 30. The first return path section 40 and the second return path section 30 are each formed of a magnetic material. For example, CoFeN, CoNiFe, NiFe, or CoFe can be used to form each of the first return path section 40 and the second return path section 30. The first return path section 40 and the second return path section 30 are in alignment with each other in a direction perpendicular to the top surface 1a of the substrate 1 with the main pole 15 interposed therebetween. The first return path section 40 is located on the front side in the direction T of travel of the recording medium 100 relative to the main pole 15, and connects the write shield 16 and part of the main pole 15 located away from the medium facing surface 90 to each other, thereby magnetically coupling the write shield 16 and the main pole 15 to each other. The second return path section 30 is located on the rear side in the direction T of travel of the recording medium 100 relative to the main pole 15, and connects the write shield 16 and part of the main pole 15 located away from the medium facing surface 90 to each other, thereby magnetically coupling the write shield 16 and the main pole 15 to each other.

The second return path section 30 includes magnetic layers 31, 32, 33 and 34. The magnetic layer 31 lies on the nonmagnetic layer 80. The magnetic layers 32 and 33 both lie on the magnetic layer 31. The magnetic layer 32 is located near the medium facing surface 90. The magnetic layer 33 is located farther from the medium facing surface 90 than is the magnetic layer 32. The magnetic layer 31 has an end face facing toward the medium facing surface 90, and this end face of the magnetic layer 31 is located at a distance from the medium facing surface 90. The magnetic layer 32 has an end face located in the medium facing surface 90. As shown in FIG. 5, the second portion 10 of the coil is wound approximately three turns around the magnetic layer 33.

The write head unit 9 further includes: an insulating layer 51 formed of an insulating material, lying on the nonmagnetic layer 80 and surrounding the magnetic layer 31; an insulating film 52 formed of an insulating material and isolating the second portion 10 from the magnetic layers 31 to 33; an insulating layer 53 formed of an insulating material and disposed in the space between adjacent turns of the second portion 10; and an insulating layer 54 formed of an insulating material and disposed around the second portion 10 and the magnetic layers 32 and 33. The top surfaces of the second portion 10, the magnetic layers 32 and 33, the insulating film 52, and the insulating layers 53 and 54 are even with each other. The write head unit 9 further includes an insulating layer 55 formed of an insulating material and lying on the second portion 10, the insulating film 52 and the insulating layers 53 and 54. The insulating layers 51, 54 and 55 and the insulating film 52 are formed of alumina, for example. The insulating layer 53 is formed of a photoresist, for example.

The magnetic layer 34 lies on the magnetic layer 33. The magnetic layer 34 is located away from the medium facing surface 90 and in contact with a portion of the main pole 15 located away from the medium facing surface 90. More specifically, the magnetic layer 34 is in contact with a portion of a bottom end of the main pole 15 located away from the medium facing surface 90, which will be described later.

As shown in FIG. 3, the write shield 16 includes a first shield 16A, a second shield 16B, and two side shields 16C and 16D. The first shield 16A is located on the front side in the direction T of travel of the recording medium 100 relative to the main pole 15. The second shield 16B is located on the rear side in the direction T of travel of the recording medium 100 relative to the main pole 15. The two side shields 16C and 16D are located on opposite sides of the main pole 15 in the track width direction TW and magnetically couple the first shield 16A and the second shield 16B to each other.

As shown in FIG. 2 and FIG. 3, the first shield 16A has the first end face portion 16Aa, a top surface, and a connecting surface connecting the top surface to the first end face portion 16Aa. The distance from the medium facing surface 90 to an arbitrary point on the connecting surface of the first shield 16A increases with increasing distance from the arbitrary point to the top surface 1a of the substrate 1. As shown in FIG. 3, the second shield 16B has the second end face portion 16Ba. The side shield 16C has the third end face portion 16Ca. The side shield 16D has the fourth end face portion 16Da.

The second shield 16B lies on the magnetic layer 32. The write head unit 9 further includes a nonmagnetic layer 56 formed of a nonmagnetic material. The nonmagnetic layer 56 lies on the insulating layer 55 and surrounds the magnetic layers 32 and 33. The nonmagnetic layer 56 is formed of alumina, for example.

The main pole 15 has the end face 15a, a top surface 15T (see FIG. 2) lying at the front end in the direction T of travel of the recording medium 100, a bottom end 15L (see FIG. 2) opposite to the top surface 15T, and first and second side parts (see FIG. 3) opposite to each other in the track width direction TW. The side shield 16C has a first sidewall opposed to the first side part of the main pole 15. The side shield 16D has a second sidewall opposed to the second side part of the main pole 15.

The side shields 16C and 16D are disposed on the second shield 16B. The write head unit 9 further includes a second gap layer 18 formed of a nonmagnetic material. The second gap layer 18 is arranged to extend along the sidewalls of the side shields 16C and 16D, the top surface of the second shield 16B and the top surface of the nonmagnetic layer 56. The nonmagnetic material used to form the second gap layer 18 may be an insulating material or a nonmagnetic metal material. Alumina is an example of an insulating material that can be used to form the second gap layer 18. Ru is an example of a nonmagnetic metal material that can be used to form the second gap layer 18.

The main pole 15 lies over the second shield 16B and the nonmagnetic layer 56 with the second gap layer 18 interposed between the main pole 15 and each of the top surface of the second shield 16B and a portion of the top surface of the nonmagnetic layer 56. As shown in FIG. 3, the second gap layer 18 is interposed also between the main pole 15 and the side shields 16C and 16D.

A portion of the bottom end 15L of the main pole 15 located away from the medium facing surface 90 is in contact with the top surface of the magnetic layer 34. The main pole 15 is formed of a magnetic metal material. The material of the main pole 15 may be, for example, NiFe, CoNiFe, or CoFe. The shape of the main pole 15 will be described in detail later.

The write head unit 9 further includes a nonmagnetic layer 60 formed of a nonmagnetic material and disposed around the main pole 15 and the side shields 16C and 16D. The nonmagnetic layer 60 is formed of alumina, for example.

The write head unit 9 further includes a nonmagnetic metal layer 58 formed of a nonmagnetic metal material, located away from the medium facing surface 90 and lying on a portion of the top surface 15T of the main pole 15, and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina, for example.

The write head unit 9 further includes a first gap layer 19 formed of a nonmagnetic material. The first gap layer 19 is disposed to cover the main pole 15, the nonmagnetic metal layer 58 and the insulating layer 59. The material used for the first gap layer 19 may be a nonmagnetic insulating material such as alumina or a nonmagnetic conductive material such as Ru, NiCu, Ta, W, NiB, or NiP.

The first shield 16A is disposed over the side shields 16C and 16D and the first gap layer 19. In the medium facing surface 90, part of the first end face portion 16Aa of the first shield 16A is spaced from the end face 15a of the main pole 15 by a predetermined distance created by the thickness of the first gap layer 19. The thickness of the first gap layer 19 preferably falls within the range of 5 to 60 nm, and may be 30 to 60 nm, for example. The end face 15a of the main pole 15 has a side adjacent to the first gap layer 19. This side of the end face 15a defines the track width.

The first return path section 40 includes magnetic layers 41 and 42. The magnetic layer 41 is located away from the medium facing surface 90 and in contact with a portion of the main pole 15 located away from the medium facing surface 90. More specifically, the magnetic layer 41 is in contact with a portion of the top surface 15T of the main pole 15 located away from the medium facing surface 90.

The write head unit 9 further includes an insulating layer 81 formed of an insulating material. The insulating layer 81 lies on a portion of the top surface 15T of the main pole 15 on which none of the first gap layer 19, the magnetic layer 41 and the nonmagnetic metal layer 58 are present. The insulating layer 81 is formed of alumina, for example.

The write head unit 9 further includes a second heater 82 lying on the insulating layer 81, an insulating layer 83 formed of an insulating material and covering the insulating layer 81 and the second heater 82, and a metal portion 84 formed of a metal material and disposed with the second heater 82 interposed between the metal portion 84 and the main pole 15. The insulating layer 83 is interposed between the second heater 82 and the metal portion 84. The insulating layer 83 is formed of alumina, for example.

The second heater 82 is located away from the medium facing surface 90. The metal portion 84 is separated from the first return path section 40 and the second return path section 30. In the example shown in FIG. 1, the bottom surface of the metal portion 84 around the second heater 82 is in contact with the top surface 15T of the main pole 15. The metal portion 84 may be in non-contact with the main pole 15. In such a case, the insulating layers 81 and 83 are interposed between the main pole 15 and the metal portion 84. The second heater 82 will be described in more detail later.

The metal material used to form the metal portion 84 may be a magnetic metal material. For example, CoFeN, CoNiFe, NiFe or CoFe may be the magnetic metal material used to form the metal portion 84. In the case of employing a magnetic metal material as the metal material to form the metal portion 84, the magnetic layer 41 may be formed of the same magnetic metal material as that used for the metal portion 84. The magnetic layer 41 and the metal portion 84 are disposed such that an imaginary plane passing through the magnetic layer 41 and the metal portion 84 can lie parallel to the top surface 1a of the substrate 1.

As shown in FIG. 7, the first portion 20 of the coil is wound approximately two turns around the magnetic layer 41 and the metal portion 84. The write head unit 9 further includes: an insulating film 61 formed of an insulating material and isolating the first portion 20 from the first shield 16A, the first gap layer 19 and the magnetic layer 41; an insulating layer 62 formed of an insulating material and disposed in the space between adjacent turns of the first portion 20; and a nonmagnetic layer 63 formed of a nonmagnetic material and disposed around the first portion 20, the first shield 16A and the metal portion 84. The insulating film 61 and the nonmagnetic layer 63 are formed of alumina, for example. The insulating layer 62 is formed of a photoresist, for example. The top surfaces of the first shield 16A, the first portion 20, the magnetic layer 41, the metal portion 84, the insulating film 61 and the nonmagnetic layer 63 are even with each other.

The write head unit 9 further includes an insulating layer 64 formed of an insulating material and disposed over the top surfaces of the first portion 20, the insulating film 61 and the insulating layer 62. The insulating layer 64 is formed of alumina, for example.

The magnetic layer 42 lies on the first shield 16A, the magnetic layer 41 and the insulating layer 64, and connects the first shield 16A to the magnetic layer 41. The magnetic layer 42 has an end face facing toward the medium facing surface 90, and this end face of the magnetic layer 42 is located at a distance from the medium facing surface 90. The distance from the medium facing surface 90 to an arbitrary point on the end face of the magnetic layer 42 increases with increasing distance from the arbitrary point to the top surface 1a of the substrate 1.

The write head unit 9 further includes a nonmagnetic layer 65 formed of a nonmagnetic material and disposed around the magnetic layer 42. A portion of the nonmagnetic layer 65 is interposed between the medium facing surface 90 and each of the connecting surface of the first shield 16A and the end face of the magnetic layer 42 that faces toward the medium facing surface 90. The nonmagnetic layer 65 is formed of alumina, for example.

The write head unit 9 further includes a nonmagnetic layer 85 formed of a nonmagnetic material and lying on the magnetic layer 42 and the nonmagnetic layer 65, a second contact sensor 86 lying on the nonmagnetic layer 85, a pair of leads 173 and 174 (see FIG. 8) connected to opposite ends of the second contact sensor 86, and a nonmagnetic layer 87 formed of a nonmagnetic material and disposed to cover the nonmagnetic layer 85, the second contact sensor 86 and the leads 173 and 174. In FIG. 8, the boundaries between the second contact sensor 86 and the leads 173 and 174 are indicated in dotted lines. The nonmagnetic layers 85 and 87 are formed of alumina, for example. The second contact sensor 86 will be described in detail later.

The write head unit 9 further includes a metal layer 88 formed of a metal material and lying on the nonmagnetic layer 87, and a nonmagnetic layer 89 formed of a nonmagnetic material and surrounding the metal layer 88. The metal material used to form the metal layer 88 may be a magnetic metal material. For example, CoFeN, CoNiFe, NiFe or CoFe may be the magnetic metal material used to form the metal layer 88. The nonmagnetic layer 89 is formed of alumina, for example.

The magnetic head further includes a protective layer 70 formed of a nonmagnetic material and disposed to cover the write head unit 9. The protective layer 70 is formed of alumina, for example.

As has been described, the magnetic head according to the present embodiment includes the medium facing surface 90, the read head unit 8 for reading data stored on the recording medium 100, and the write head unit 9 for writing data on the recording medium 100. The read head unit 8 has the first end face 8a located in the medium facing surface 90 and includes the first contact sensor 76. The write head unit 9 has the second end face 9a located in the medium facing surface 90 and includes the second contact sensor 86. The first contact sensor 76 is to detect contact of the first end face 8a with the recording medium 100. The second contact sensor 86 is to detect contact of the second end face 9a with the recording medium 100.

The first end face 8a and the second end face 9a are located at positions different from each other in the direction T of travel of the recording medium 100. In the present embodiment, the read head unit 8 is located on the rear side in the direction T of travel of the recording medium 100 relative to the write head unit 9. The first end face 8a is thus located on the rear side in the direction T of travel of the recording medium 100 relative to the second end face 9a.

As shown in FIG. 4, the leads 171 and 172 are connected to opposite ends of the first contact sensor 76. As shown in FIG. 8, the leads 173 and 174 are connected to opposite ends of the second contact sensor 86. The lead 172 has a sensor connection 172E located near an end of the lead 172 farther from the boundary between the lead 172 and the first contact sensor 76. The lead 173 has a sensor connection 173S located near an end of the lead 173 farther from the boundary between the lead 173 and the second contact sensor 86. The sensor connection 173S is electrically connected to the sensor connection 172E via a contact-sensor connection layer 170 (see FIG. 5 to FIG. 7) of columnar shape which penetrates a plurality of layers interposed between the lead 172 and the lead 173. The contact-sensor connection layer 170 is formed of a conductive material such as copper. In the example shown in FIG. 4 to FIG. 8, the first contact sensor 76 and the second contact sensor 86 are connected in series.

The first contact sensor 76 is, for example, a resistor that changes in resistance in response to a change in its own temperature upon contact of part of the first end face 8a with the recording medium 100. The second contact sensor 86 is, for example, a resistor that changes in resistance in response to a change in its own temperature upon contact of part of the second end face 9a with the recording medium 100. A portion of each of the resistors extends in the track width direction TW. The resistors are each formed of a metal material or a semiconductor material that changes in resistance at a relatively high rate with respect to a change in temperature, i.e., that has a relatively high temperature coefficient of resistance. Specifically, the material for the resistors may be NiFe, W, Cu, Ni, or Pt, for example.

Upon contact of part of the first end face 8a with the recording medium 100, the frictional heat resulting from the contact raises the temperature of the first end face 8a at and in the vicinity of the part in contact with the recording medium 100. Such a rise in temperature also raises the temperature of the first contact sensor 76 (the resistor) itself. As a result, the first contact sensor 76 changes in resistance. The amount of change in resistance of the first contact sensor 76 upon contact of part of the first end face 8a with the recording medium 100 is, for example, on the order of 10 to 15 percent of the resistance of the first contact sensor 76 before the contact.

Similarly, upon contact of part of the second end face 9a with the recording medium 100, the frictional heat resulting from the contact raises the temperature of the second end face 9a at and in the vicinity of the part in contact with the recording medium 100. Such a rise in temperature also raises the temperature of the second contact sensor 86 (the resistor) itself. As a result, the second contact sensor 86 changes in resistance. The amount of change in resistance of the second contact sensor 86 upon contact of part of the second end face 9a with the recording medium 100 is, for example, on the order of 10 to 15 percent of the resistance of the second contact sensor 86 before the contact.

In the present embodiment, the first contact sensor 76 and the second contact sensor 86 are connected in series. It is thus possible to detect contact of the first and second end faces 8a and 9a with the recording medium 100 by measuring via the leads 171 and 174 the total resistance of the first and second contact sensors 76 and 86 or the value of a parameter having a correlation therewith.

The leads 171 and 172 may be formed of the same material as the first contact sensor 76. In this case, the first contact sensor 76 and the leads 171 and 172 may be formed into a single component. Similarly, the leads 173 and 174 may be formed of the same material as the second contact sensor 86. In this case, the second contact sensor 86 and the leads 173 and 174 may be formed into a single component.

The magnetic head further includes a protrusion device for causing part of the medium facing surface 90 to protrude toward the recording medium 100. The protrusion device includes the first heater 72 and the second heater 82. The first heater 72 is to generate heat to cause the first end face 8a to protrude. The second heater 82 is to generate heat to cause the second end face 9a to protrude.

In the present embodiment, the first heater 72 is located closer to the MR element 5 of the read head unit 8 than to the main pole 15 of the write head unit 9. The second heater 82 is located closer to the main pole 15 of the write head unit 9 than to the MR element 5 of the read head unit 8. The first contact sensor 76 is located closer to the first heater 72 than to the second heater 82. The second contact sensor 86 is located closer to the second heater 82 than to the first heater 72.

The first heater 72 includes a line-shaped conductor which generates heat when energized. The line-shaped conductor may be meandering in shape. The magnetic head according to the present embodiment includes a pair of leads (not illustrated) that are connected to opposite ends of the line-shaped conductor. The line-shaped conductor is configured to be energized through the pair of leads to thereby generate heat. For example, the line-shaped conductor is formed of a film of NiCr or a layered film formed by stacking a film of Ta, a film of NiCu and a film of Ta. The function of the first heater 72 will be described in detail later.

The main pole 15 and the metal portion 84 of the write head unit 9 define therebetween a receiving space 150 for receiving at least part of the second heater 82. The metal portion 84 has a recess 84a which opens in the bottom surface of the metal portion 84. The recess 84a extends in the track width direction TW. The receiving space 150 is a space located between the recess 84a and the top surface 15T of the main pole 15.

At least part of the second heater 82 is received in the receiving space 150. The second heater 82 includes a line-shaped conductor 82A which generates heat when energized. The line-shaped conductor 82A is located in the receiving space 150. As shown in FIG. 6, the line-shaped conductor 82A includes two linear portions 82A1 and 82A2 extending linearly in the track width direction TW, and a connecting portion 82A3 connecting one end of the linear portion 82A1 to one end of the linear portion 82A2. The connecting portion 82A3 is U-shaped, for example. The linear portion 82A2 is located farther from the medium facing surface 90 than is the linear portion 82A1. A part of each of the linear portions 82A1 and 82A2 is located in the receiving space 150. One end and the other end of the linear portion 82A1, one end and the other end of the linear portion 82A2, and the connecting portion 82A3 are located outside the receiving space 150.

The magnetic head according to the present embodiment includes a pair of leads 191 and 192 connected to the other end of the linear portion 82A1 and the other end of the linear portion 82A2, respectively. The line-shaped conductor 82A is configured to be energized through the pair of leads 191 and 192 to thereby generate heat. In FIG. 6, the boundary between the linear portion 82A1 and the lead 191 and the boundary between the linear portion 82A2 and the lead 192 are indicated in dotted lines. For example, the line-shaped conductor 82A is formed of a film of NiCr or a layered film formed by stacking a film of Ta, a film of NiCu and a film of Ta. The function of the second heater 82 will be described in detail later.

The first return path section 40, the second return path section 30, the first portion 20 of the coil, and the second portion 10 of the coil will now be described in detail with reference to FIG. 2 and FIG. 5 to FIG. 7. As shown in FIG. 2, the first return path section 40 includes the magnetic layers 41 and 42, and is located on the front side in the direction T of travel of the recording medium 100 relative to the main pole 15. The first return path section 40 connects the write shield 16 (the first shield 16A) and part of the main pole 15 located away from the medium facing surface 90 to each other so that a first space S1 is defined by the main pole 15, the write shield 16 and the first return path section 40 (the magnetic layers 41 and 42).

As shown in FIG. 2, the second return path section 30 includes the magnetic layers 31 to 34, and is located on the rear side in the direction T of travel of the recording medium 100 relative to the main pole 15. The second return path section 30 connects the write shield 16 (the second shield 16B) and part of the main pole 15 located away from the medium facing surface 90 to each other so that a second space S2 is defined by the main pole 15, the write shield 16 and the second return path section 30 (the magnetic layers 31 to 34).

As shown in FIG. 7, the first portion 20 of the coil is wound approximately two turns around the metal portion 84 and the magnetic layer 41 which constitutes part of the first return path section 40. The first portion 20 includes a portion that extends to pass between the first shield 16A and the magnetic layer 41, in particular, within the first space S1. The first portion 20 has a coil connection 20E electrically connected to the second portion 10.

As shown in FIG. 5, the second portion 10 of the coil is wound approximately three turns around the magnetic layer 33 which constitutes part of the second return path section 30. The second portion 10 includes a portion that extends to pass between the magnetic layer 32 and the magnetic layer 33, in particular, within the second space S2. The second portion 10 has a coil connection 10S electrically connected to the coil connection 20E of the first portion 20. The coil connection 10S is electrically connected to the coil connection 20E via a connection layer 110 (see FIG. 6) of columnar shape which penetrates a plurality of layers interposed between the first portion 20 and the second portion 10. The connection layer 110 is formed of a conductive material such as copper. In the example shown in FIG. 5 to FIG. 7, the first portion 20 and the second portion 10 are connected in series.

Now, the shapes of the first shield 16A, the second shield 16B and the magnetic layers 31 to 34, 41 and 42 will be described in detail with reference to FIG. 5 and FIG. 7. As shown in FIG. 7, the first shield 16A includes a central portion, and two side portions located on opposite sides of the central portion in the track width direction TW. The central portion includes the first end face portion 16Aa of the first shield 16A, and is disposed to intersect the main cross section. The two side portions are greater than the central portion in maximum length in the direction perpendicular to the medium facing surface 90.

As shown in FIG. 5, the magnetic layer 32 includes a central portion, and two side portions located on opposite sides of the central portion in the track width direction TW. The central portion includes the end face of the magnetic layer 32 located in the medium facing surface 90, and is disposed to intersect the main cross section. The two side portions are greater than the central portion in maximum length in the direction perpendicular to the medium facing surface 90. Although not illustrated, the second shield 16B also includes a central portion and two side portions. The central portion includes the second end face portion 16Ba of the second shield 16B and intersects the main cross section.

The first shield 16A and the magnetic layers 41 and 42 constitute a first coil surrounding portion shaped to surround a part of the first portion 20. The first coil surrounding portion has a first coil-surrounding-portion end face constituted of the first end face portion 16Aa of the first shield 16A. The first coil surrounding portion defines a space (hereinafter referred to as the first coil receiving space) whose width in the track width direction TW increases with increasing distance from the medium facing surface 90. As shown in FIG. 7, the width of the first coil-surrounding-portion end face in the track width direction TW is smaller than the maximum width of the first coil receiving space in the track width direction TW.

Likewise, the second shield 16B and the magnetic layers 31 to 34 constitute a second coil surrounding portion shaped to surround a part of the second portion 10. The second coil surrounding portion has a second coil-surrounding-portion end face constituted of the second end face portion 16Ba of the second shield 16B and the end face of the magnetic layer 32. The second coil surrounding portion defines a space (hereinafter referred to as the second coil receiving space) whose width in the track width direction TW increases with increasing distance from the medium facing surface 90. As shown in FIG. 5, the width of the second coil-surrounding-portion end face in the track width direction TW is smaller than the maximum width of the second coil receiving space in the track width direction TW.

The shape of the main pole 15 will now be described in detail with reference to FIG. 2, FIG. 3 and FIG. 6. As shown in FIG. 6, the main pole 15 includes a track width defining portion 15A and a wide portion 15B. The track width defining portion 15A has an end face located in the medium facing surface 90, and an end opposite to the end face. The wide portion 15B is connected to the end of the track width defining portion 15A. As shown in FIG. 2 and FIG. 3, the main pole 15 has the top surface 15T lying at the front end in the direction T of travel of the recording medium 100, the bottom end 15L opposite to the top surface 15T, the first side part, and the second side part. The top surface 15T of the main pole 15 includes the top surface of the track width defining portion 15A and the top surface of the wide portion 15B. The top surface of the wide portion 15B is greater than the top surface of the track width defining portion 15A in width in the track width direction TW.

The width of the top surface of the track width defining portion 15A in the track width direction TW is generally constant regardless of distance from the medium facing surface 90. The width of the top surface of the wide portion 15B in the track width direction TW is, for example, equal to that of the top surface of the track width defining portion 15A at the boundary between the track width defining portion 15A and the wide portion 15B, and gradually increases with increasing distance from the medium facing surface 90, then becoming constant. Here, the length of the track width defining portion 15A in the direction perpendicular to the medium facing surface 90 will be referred to as the neck height. The neck height falls within the range of 0 to 0.3 µm, for example. A zero neck height means that the track width defining portion 15A is not present and thus an end face of the wide portion 15B is located in the medium facing surface 90.

The top surface 15T includes a first inclined portion and a first flat portion, the first inclined portion being closer to the medium facing surface 90. The first inclined portion has a first end located in the medium facing surface 90 and a second end opposite to the first end. The first flat portion is connected to the second end of the first inclined portion. The first inclined portion is inclined such that its second end is located on the front side in the direction T of travel of the recording medium 100 relative to its first end. The first flat portion extends substantially perpendicular to the medium facing surface 90.

The bottom end 15L includes a second inclined portion, a second flat portion, a third inclined portion, and a third flat portion that are contiguously arranged in this order, the second inclined portion being closest to the medium facing surface 90. The second inclined portion has a first end located in the medium facing surface 90 and a second end opposite to the first end. The second flat portion is connected to the second end of the second inclined portion. The third inclined portion has a third end connected to the second flat portion and a fourth end that is located farther from the medium facing surface 90 than is the third end. Each of the second inclined portion, the second flat portion and the third inclined portion may be an edge formed by two intersecting planes, or may be a plane connecting two planes to each other. The third flat portion is a plane connected to the fourth end of the third inclined portion. The second inclined portion is inclined such that its second end is located on the rear side in the direction T of travel of the recording medium 100 relative to its first end. The third inclined portion is inclined such that its fourth end is located on the rear side in the direction T of travel of the recording medium 100 relative to its third end. The second and third flat portions each extend substantially perpendicular to the medium facing surface 90.

The end face 15a of the main pole 15 located in the medium facing surface 90 has a first side adjacent to the first gap layer 19, a second side connected to one end of the first side, and a third side connected to the other end of the first side. The first side defines the track width. The position of an end of a record bit to be recorded on the recording medium 100 is determined by the position of the first side. The width in the track width direction TW of the end face 15a of the main pole 15 located in the medium facing surface 90 decreases with increasing distance from the first side, that is, with increasing proximity to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 µm, for example.

The function and effects of the magnetic head according to the present embodiment will now be described. The magnetic head writes data on the recording medium 100 by using the write head unit 9 and reads data stored on the recording medium 100 by using the read head unit 8. In the write head unit 9, the coil including the first portion 20 and the second portion 10 produces magnetic fields corresponding to the data to be written on the recording medium 100. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. Consequently, the main pole 15 passes therethrough the magnetic flux corresponding to the magnetic field produced by the first portion 20 and the magnetic flux corresponding to the magnetic field produced by the second portion 10.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 passes therethrough the magnetic fluxes corresponding to the magnetic fields produced by the coil as mentioned above, and produces a write magnetic field for writing data on the recording medium 100 by means of the perpendicular magnetic recording system.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 100. The write shield 16 also has the function of capturing a magnetic flux that is produced from the end face 15a of the main pole 15 and spreads in directions other than the direction perpendicular to the surface of the recording medium 100, and thereby preventing the magnetic flux from reaching the recording medium 100.

Furthermore, the write shield 16 and the first and second return path sections 40 and 30 have the function of allowing a magnetic flux that has been produced from the end face 15a of the main pole 15 and has magnetized a portion of the recording medium 100 to flow back. More specifically, a portion of the magnetic flux that has been produced from the end face 15a of the main pole 15 and has magnetized a portion of the recording medium 100 flows back to the main pole 15 through the write shield 16 and the first return path section 40. Another portion of the magnetic flux that has been produced from the end face 15a of the main pole 15 and has magnetized the portion of the recording medium 100 flows back to the main pole 15 through the write shield 16 and the second return path section 30.

The write shield 16 includes the first shield 16A, the second shield 16B, and the two side shields 16C and 16D. The present embodiment thus makes it possible that, in regions on both the front side and the rear side in the direction T of travel of the recording medium 100 relative to the end face 15a of the main pole 15 and regions on opposite sides of the end face 15a of the main pole 15 in the track width direction TW, a magnetic flux that is produced from the end face 15a of the main pole 15 and spreads in directions other than the direction perpendicular to the surface of the recording medium 100 can be captured and thereby prevented from reaching the recording medium 100. Consequently, the present embodiment makes it possible to prevent the occurrence of a phenomenon that signals already written on one or more tracks in the neighborhood of a track targeted for writing are erased or attenuated during writing of a signal on the track targeted for writing (such a phenomenon will hereinafter be referred to as unwanted erasure).

The functions of the first and second heaters 72 and 82 and the first and second contact sensors 76 and 86 will now be described in detail. The line-shaped conductor of the first heater 72 generates heat when energized. The heat generated by this line-shaped conductor is transferred to a plurality of components of the read head unit 8 located near the first heater 72, such as the read shield layers 3 and 7. In this manner, the plurality of components of the read head unit 8 located near the first heater 72 are heated by the first heater 72. These components expand by being heated. As a result, the first end face 8a of the read head unit 8 protrudes toward the recording medium 100. This reduces the distance between the first end face 8a of the read head unit 8 and the recording medium 100, thereby allowing for the enhancement of recording density while preventing the reading capability of the read head unit 8 from being reduced with increases in recording density.

The line-shaped conductor 82A of the second heater 82 generates heat when energized. The heat generated by the line-shaped conductor 82A is transferred to the main pole 15. In this manner, the main pole 15 is heated by the second heater 82. The main pole 15 expands by being heated, and as a result, the second end face 9a of the write head unit 9 including the end face 15a of the main pole 15 located in the medium facing surface 90 protrudes toward the recording medium 100. This reduces the distance between the second end face 9a of the write head unit 9 and the recording medium 100, thereby allowing for the enhancement of recording density.

Figure 9:
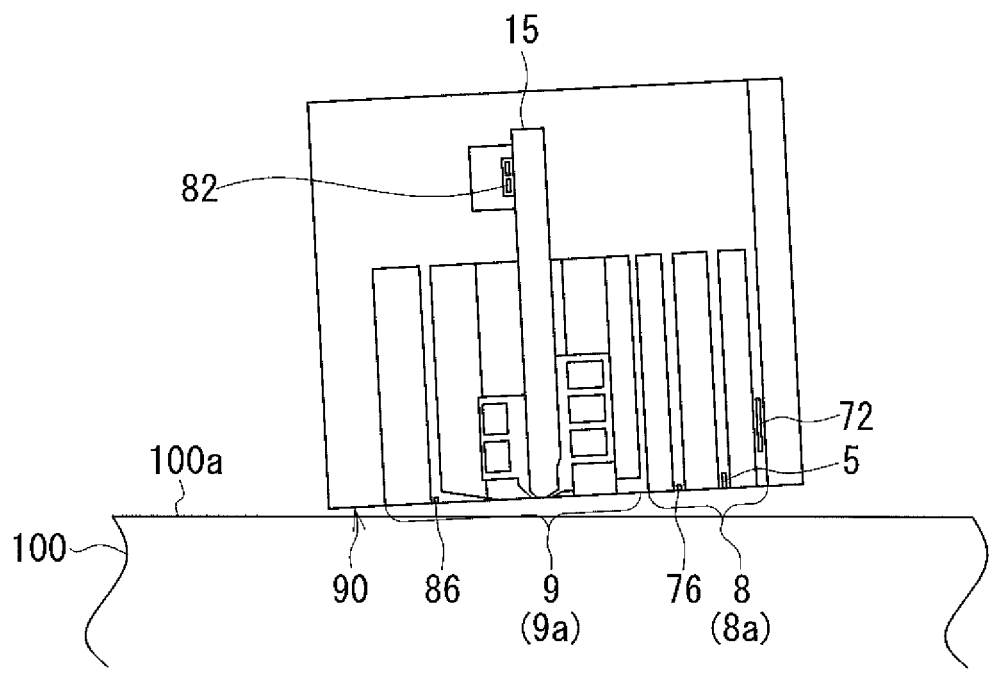
FIG. 9 is an explanatory diagram showing a first state of the magnetic head in a test to be performed before shipment of a magnetic disk drive as a final product that uses the magnetic head according to the first embodiment of the invention.
Figure 10:
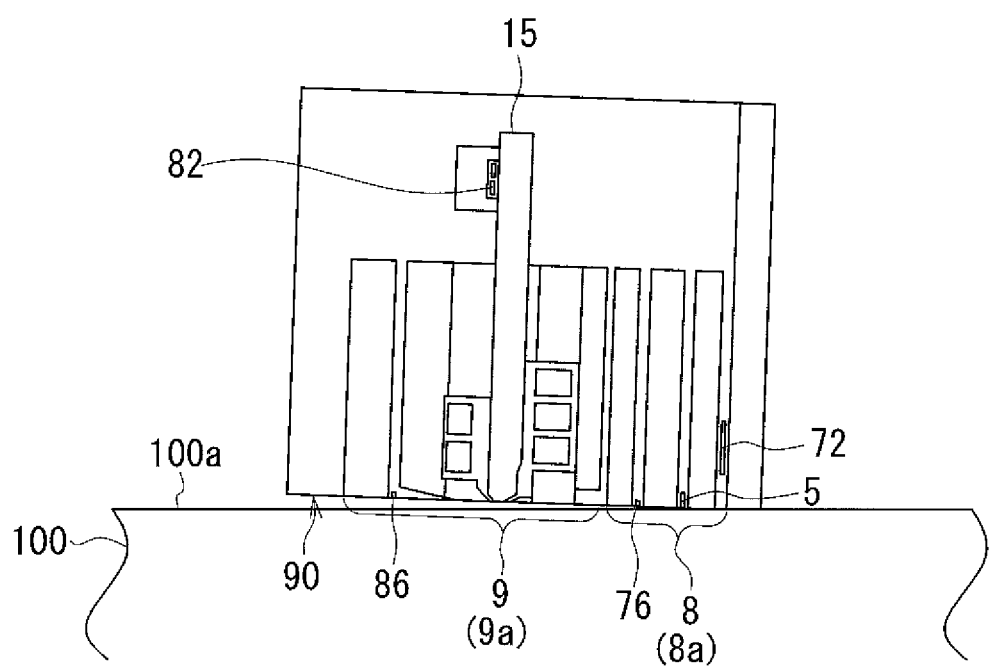
FIG. 10 is an explanatory diagram showing a second state of the magnetic head in the aforementioned test.

Now, a description will be given of an example of how to recognize and control the distance between the first end face 8a of the read head unit 8 and the recording medium 100 and the distance between the second end face 9a of the write head unit 9 and the recording medium 100. The amount of protrusion of the first end face 8a of the read head unit 8 has a correlation with the magnitude of the power being supplied to the first heater 72, and the amount of protrusion of the second end face 9a of the write head unit 9 has a correlation with the magnitude of the power being supplied to the second heater 82. Before shipment of a magnetic disk drive as a final product, the following test is performed. In the test, the slider is made to float above the surface of a rotating recording medium 100. FIG. 9 illustrates a first state of the magnetic head in which the magnetic head is floating. In FIG. 9 the reference symbol 100a indicates the surface of the recording medium 100. When the magnetic head is in the first state, the distance between the read head unit 8 and the recording medium 100 is greater than the distance between the write head unit 9 and the recording medium 100. Then, the magnitude of the power being supplied to the first heater 72 is gradually increased to gradually increase the amount of protrusion of the first end face 8a of the read head unit 8 from the first state. Upon contact of the first end face 8a of the read head unit 8 with the recording medium 100, the contact is detected by the first contact sensor 76. This determines the magnitude of supply power to the first heater 72 at which the first end face 8a of the read head unit 8 comes into contact with the recording medium 100. Such magnitude of supply power will be referred to as "the first power at contact". FIG. 10 illustrates a second state of the magnetic head in which the first end face 8a of the read head unit 8 is thereby in contact with the recording medium 100.

Figure 11:
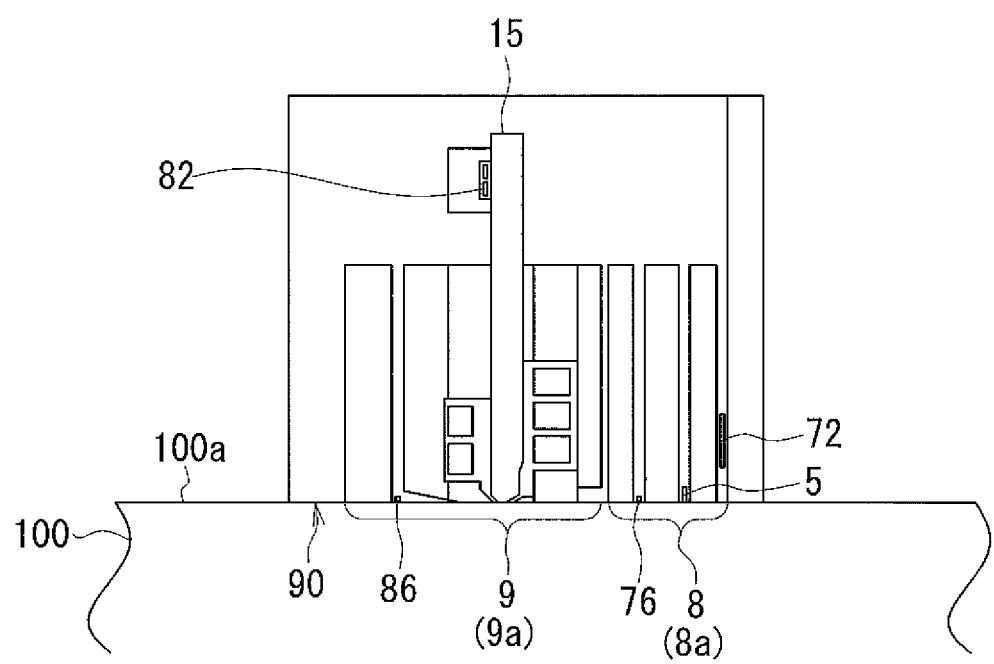
FIG. 11 is an explanatory diagram showing a third state of the magnetic head in the aforementioned test.

Then, the magnitude of the power being supplied to the second heater 82 is gradually increased to gradually increase the amount of protrusion of the second end face 9a of the write head unit 9 from the second state. Upon contact of the second end face 9a of the write head unit 9 with the recording medium 100, the contact is detected by the second contact sensor 86. This determines the magnitude of supply power to the second heater 82 at which the second end face 9a of the write head unit 9 comes into contact with the recording medium 100. Such magnitude of supply power will be referred to as "the second power at contact". FIG. 11 illustrates a third state of the magnetic head in which both of the first end face 8a and the second end face 9a are thereby in contact with the recording medium 100.

In the present embodiment, the first contact sensor 76 and the second contact sensor 86 are connected in series. In this case, a change from the first state to the second state causes a change in the resistance of mainly the first contact sensor 76, thereby causing a change in the total resistance of the first and second contact sensors 76 and 86. A further change from the second state to the third state causes a change in the resistance of mainly the second contact sensor 86, thereby causing a further change in the aforementioned total resistance. The aforementioned total resistance thus varies among the first to third states. Accordingly, the second state and the third state can be recognized on the basis of either the aforementioned total resistance or the value of a parameter having a correlation therewith.

Figure 12:
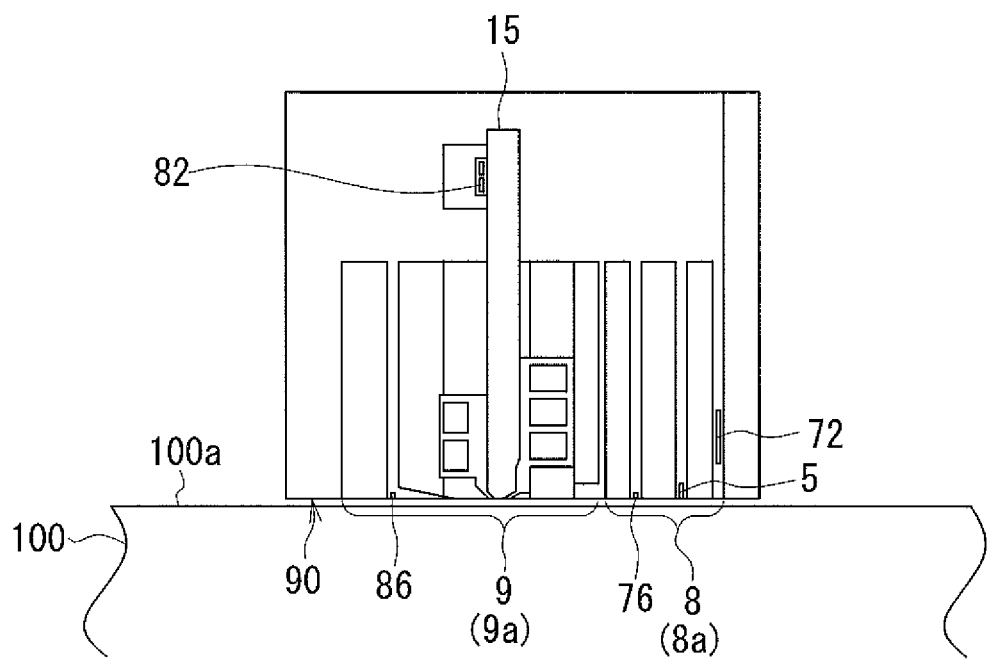
FIG. 12 is an explanatory diagram showing a state of the magnetic head during use of a magnetic disk drive that uses the magnetic head according to the first embodiment of the invention.

At the time of shipment of a magnetic disk drive as a final product, the magnitude of supply power to the first heater 72 is set to a predetermined value smaller than the first power at contact, and the magnitude of supply power to the second heater 82 is set to a predetermined value smaller than the second power at contact. In this case, the distance between the first end face 8a of the read head unit 8 and the recording medium 100 can be recognized and controlled by the magnitude of supply power to the first heater 72, and the distance between the second end face 9a of the write head unit 9 and the recording medium 100 can be recognized and controlled by the magnitude of supply power to the second heater 82. FIG. 12 shows a state of the magnetic head during use of the magnetic disk drive in which the distance between the read head unit 8 and the recording medium 100 and the distance between the write head unit 9 and the recording medium 100 are adjusted to respective desired small values. The state shown in FIG. 12 is particularly such that the distance between the read head unit 8 and the recording medium 100 is equal to the distance between the write head unit 9 and the recording medium 100.

In the present embodiment, it is thus possible, through the use of the first and second contact sensors 76 and 86, to recognize the third state of the magnetic head in which both of the first end face 8a of the read head unit 8 and the second end face 9a of the write head unit 9 are in contact with the recording medium 100. The present embodiment thus allows both of the distance between the read head unit 8 and the recording medium 100 and the distance between the write head unit 9 and the recording medium 100 to be recognized and controlled during actual use. Consequently, the present embodiment makes it possible to provide the magnetic head with desired read and write characteristics suitable for high recording densities by adjusting the distance between the read head unit 8 and the recording medium 100 and the distance between the write head unit 9 and the recording medium 100 to respective desired small values.

The other effects of the present embodiment will now be described. In the present embodiment, at least part of the second heater 82 is received in the receiving space 150 defined between the main pole 15 and the metal portion 84 which is separated from the first return path section 40 and the second return path section 30. The heat generated by the second heater 82 is transferred to the main pole 15 and the metal portion 84. The heat transferred from the second heater 82 to the metal portion 84 is further transferred to the main pole 15. The main pole 15 is heated in this way. As described above, the metal portion 84 is separated from the first return path section 40 and the second return path section 30. Thus, the heat generated by the second heater 82 is less likely to be transferred to components of the magnetic head other than the main pole 15 and the metal portion 84, particularly to the first return path section 40 and the second return path section 30. Consequently, the present embodiment allows the main pole 15 to be efficiently heated by the second heater 82 while allowing components of the magnetic head other than the main pole 15 and the metal portion 84 to be prevented from being heated by the second heater 82. The present embodiment thus makes it possible to increase the amount of protrusion of the end face 15a of the main pole 15 while suppressing protrusion of portions located around the end face 15a of the main pole 15 in the medium facing surface 90.

If the first coil-surrounding-portion end face of the first coil surrounding portion constituted of the first shield 16A and the magnetic layers 41 and 42 is exposed over a large area in the medium facing surface 90, a portion of the magnetic flux captured into the first coil surrounding portion through a portion of the first coil-surrounding-portion end face located near the end face of the main pole 15 may leak toward the recording medium 100 through another portion of the first coil-surrounding-portion end face. This may result in the occurrence of unwanted erasure. On the other hand, if the first coil surrounding portion is reduced in dimension in the track width direction TW, the first coil surrounding portion decreases in volume and thus becomes prone to flux saturation. This may result in leakage of magnetic flux from the first coil-surrounding-portion end face toward the recording medium 100, and may thereby induce unwanted erasure.

In the present embodiment, the first coil surrounding portion is shaped to form the first coil receiving space, that is, shaped to surround a part of the first portion 20 of the coil. This allows the first coil surrounding portion to be large in volume. On the other hand, the width in the track width direction TW of the first coil-surrounding-portion end face constituted of the first end face portion 16Aa of the first shield 16A is smaller than the maximum width in the track width direction TW of the first coil receiving space. This allows the first coil-surrounding-portion end face to be small in area. The present embodiment thus allows the first coil surrounding portion to be large in volume while allowing the first coil-surrounding-portion end face to be small in area.

Likewise, the second coil surrounding portion constituted of the second shield 16B and the magnetic layers 31 to 34 is shaped to form the second coil receiving space, that is, shaped to surround a part of the second portion 10 of the coil. This allows the second coil surrounding portion to be large in volume. On the other hand, the width in the track width direction TW of the second coil-surrounding-portion end face of the second coil surrounding portion constituted of the second end face portion 16Ba of the second shield 16B and the end face of the magnetic layer 32 is smaller than the maximum width in the track width direction TW of the second coil receiving space. This allows the second coil-surrounding-portion end face to be small in area. The present embodiment thus allows the second coil surrounding portion to be large in volume while allowing the second coil-surrounding-portion end face to be small in area.

As discussed above, the present embodiment allows the first and second coil surrounding portions to be large in volume while allowing the first and second coil-surrounding-portion end faces exposed in the medium facing surface 90 to be small in area. Consequently, the present embodiment makes it possible to prevent leakage of magnetic flux from the first and second coil-surrounding-portion end faces that would occur in the case where the first and second coil-surrounding-portion end faces are exposed over a large area in the medium facing surface 90 or where the first and second coil surrounding portions are small in volume. The present embodiment thus allows for preventing unwanted erasure from occurring due to leakage of magnetic flux toward the recording medium 100 from the first and second coil-surrounding-portion end faces exposed in the medium facing surface 90.

Second Embodiment

Figure 13:
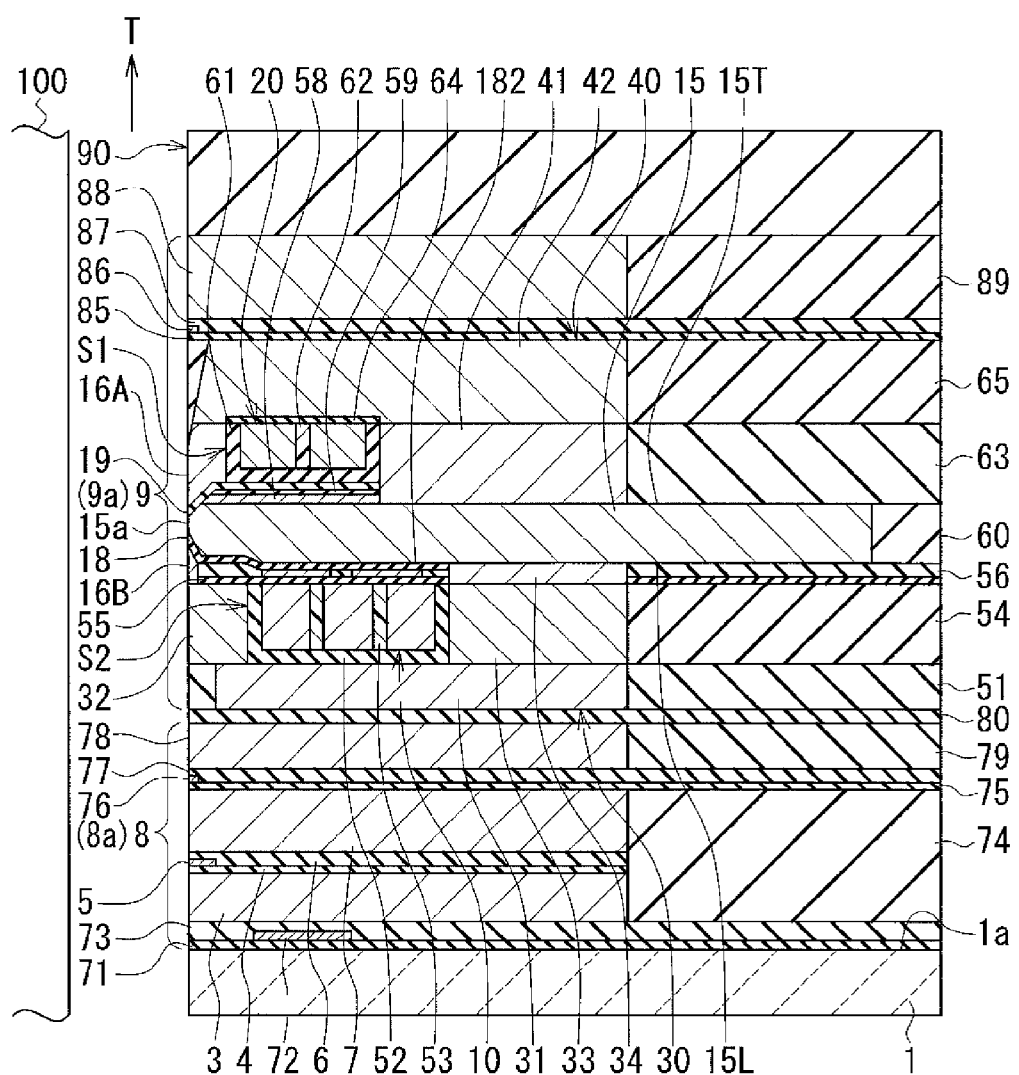
FIG. 13 is a cross-sectional view of a magnetic head according to a second embodiment of the invention.
Figure 14:
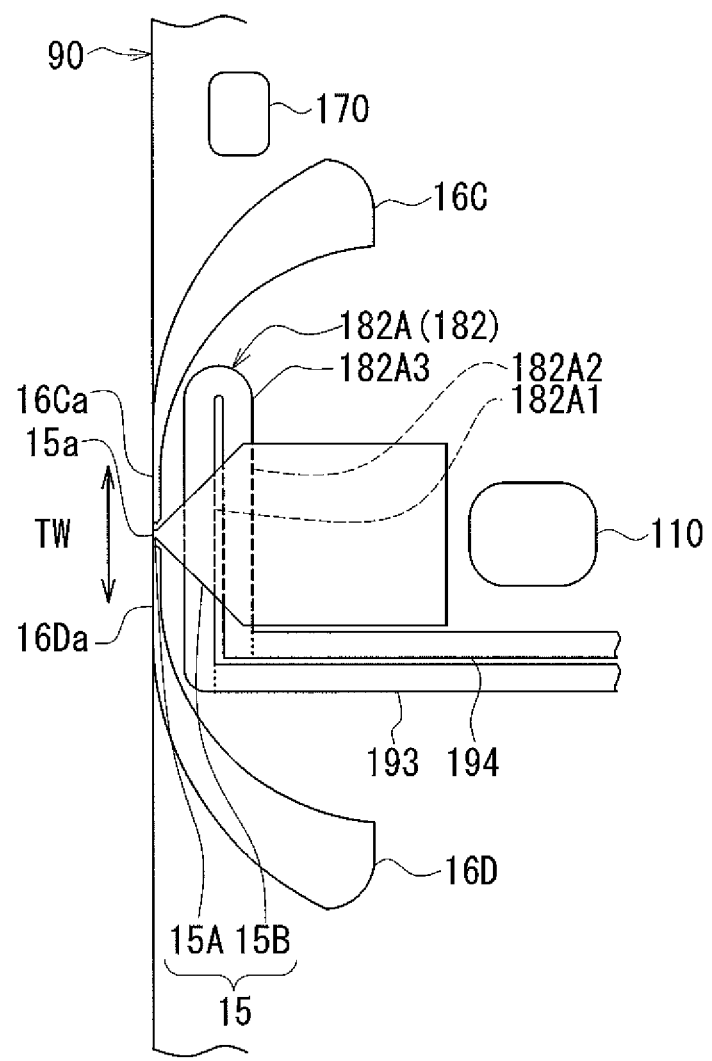
FIG. 14 is a plan view showing the main pole and the second heater of the magnetic head according to the second embodiment of the invention.

A magnetic head according to a second embodiment of the invention will now be described with reference to FIG. 13 and FIG. 14. FIG. 13 is a cross-sectional view of the magnetic head according to the present embodiment. FIG. 14 is a plan view showing the main pole and the second heater of the present embodiment.

The configuration of the magnetic head according to the present embodiment differs from that of the magnetic head according to the first embodiment in the following ways. The magnetic head according to the present embodiment does not include the insulating layers 81 and 83 and the metal portion 84. Further, the magnetic head according to the present embodiment includes a second heater 182 and leads 193 and 194 in place of the second heater 82 and the leads 191 and 192, respectively. The second heater 182 is located closer to the main pole 15 of the write head unit 9 than to the MR element 5 of the read head unit 8. More specifically, the second heater 182 is located away from the medium facing surface 90 and lies on the insulating layer 55. The nonmagnetic layer 56 is disposed around the second heater 182. The second gap layer 18 is interposed between the second heater 182 and the main pole 15. In the present embodiment, the second gap layer 18 and the nonmagnetic layer 56 are each formed of an insulating nonmagnetic material, in particular.

The second heater 182 includes a line-shaped conductor 182A which generates heat when energized. The line-shaped conductor 182A is of the same shape as the line-shaped conductor 82A of the first embodiment. More specifically, the line-shaped conductor 182A includes two linear portions 182A1 and 182A2 extending linearly in the track width direction TW, and a connecting portion 182A3 connecting one end of the linear portion 182A1 to one end of the linear portion 182A2. The connecting portion 182A3 is U-shaped, for example. The linear portion 182A2 is located farther from the medium facing surface 90 than is the linear portion 182A1. A part of each of the linear portions 182A1 and 182A2 is located directly below the main pole 15 when viewed from above. One end and the other end of the linear portion 182A1, one end and the other end of the linear portion 182A2, and the connecting portion 182A3 are located on outer sides of the main pole 15 in the track width direction TW when viewed from above.

The lead 193 is connected to the other end of the linear portion 182A1. The lead 194 is connected to the other end of the linear portion 182A2. In the present embodiment, the line-shaped conductor 182A is configured to be energized through the leads 193 and 194 to thereby generate heat. In FIG. 14, the boundary between the linear portion 182A1 and the lead 193 and the boundary between the linear portion 182A2 and the lead 194 are indicated in dotted lines. The line-shaped conductor 182A is formed of the same material as the line-shaped conductor 82A of the first embodiment.

The line-shaped conductor 182A generates heat when energized. The heat generated by the line-shaped conductor 182A is transferred to the main pole 15. In this manner, the main pole 15 is heated by the second heater 182. The main pole 15 expands by being heated, and as a result, the second end face 9a of the write head unit 9 including the end face 15a of the main pole 15 located in the medium facing surface 90 protrudes toward the recording medium 100.

The present embodiment cannot provide the advantage resulting from the second heater 82 and the metal portion 84 of the first embodiment. The remainder of configuration, function and effects of the present embodiment are similar to those of the first embodiment.

The present invention is not limited to the foregoing embodiments, and various modifications may be made thereto. For example, the first and second contact sensors of the present invention need not necessarily be resistors that change in resistance in response to a temperature change such as those illustrated in the foregoing embodiments, but can be any sensors configured to detect contact of the first end face and the second end face, respectively, with the recording medium.

Further, the first and second heaters of the present invention are not limited to the ones described in the foregoing embodiments, and can be any other heaters configured to generate heat.

Further, as far as the requirements of the appended claims are met, the shapes and locations of the first and second heaters and the first and second contact sensors are not limited to the respective examples illustrated in the foregoing embodiments but can be freely chosen as desired.

Further, the protrusion device of the present invention need not necessarily be configured to include the first and second heaters. For example, the protrusion device may be configured to include a single heater to heat a lot of components of the magnetic head to thereby allow an extensive area of the medium facing surface 90 to protrude so that the magnetic head can change from the first state shown in FIG. 9 to the third state shown in FIG. 11 without going through the second state shown in FIG. 10.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head comprising:
   a medium facing surface facing a recording medium;
   a read head unit for reading data stored on the recording medium;
   a write head unit for writing data on the recording medium; and
   a protrusion device for causing part of the medium facing surface to protrude toward the recording medium, wherein
   the read head unit has a first end face located in the medium facing surface, and includes a first contact sensor for detecting contact of the first end face with the recording medium,
   the write head unit has a second end face located in the medium facing surface, and includes a second contact sensor for detecting contact of the second end face with the recording medium, and
   the first end face and the second end face are located at positions different from each other in a direction of travel of the recording medium.

2. The magnetic head according to claim 1, wherein
   the protrusion device includes a first heater for generating heat to cause the first end face to protrude and a second heater for generating heat to cause the second end face to protrude,
   the first contact sensor is located closer to the first heater than to the second heater, and
   the second contact sensor is located closer to the second heater than to the first heater.

3. The magnetic head according to claim 1, wherein
   the read head unit includes a magnetoresistive element, and
   the write head unit includes a coil for producing a magnetic field corresponding to the data to be written by the write head unit, and a main pole configured to pass therethrough a magnetic flux corresponding to the magnetic field produced by the coil, and to produce a write magnetic field for writing the data on the recording medium by means of a perpendicular magnetic recording system.

4. The magnetic head according to claim 3, wherein
   the protrusion device includes a first heater for generating heat to cause the first end face to protrude and a second heater for generating heat to cause the second end face to protrude,
   the first heater is located closer to the magnetoresistive element than to the main pole,
   the second heater is located closer to the main pole than to the magnetoresistive element,
   the first contact sensor is located closer to the first heater than to the second heater, and
   the second contact sensor is located closer to the second heater than to the first heater.

* * * * *